J. R. EDGAR.
MOWER GUARD.
APPLICATION FILED JULY 31, 1920.
1,374,001.
Patented Apr. 5, 1921.
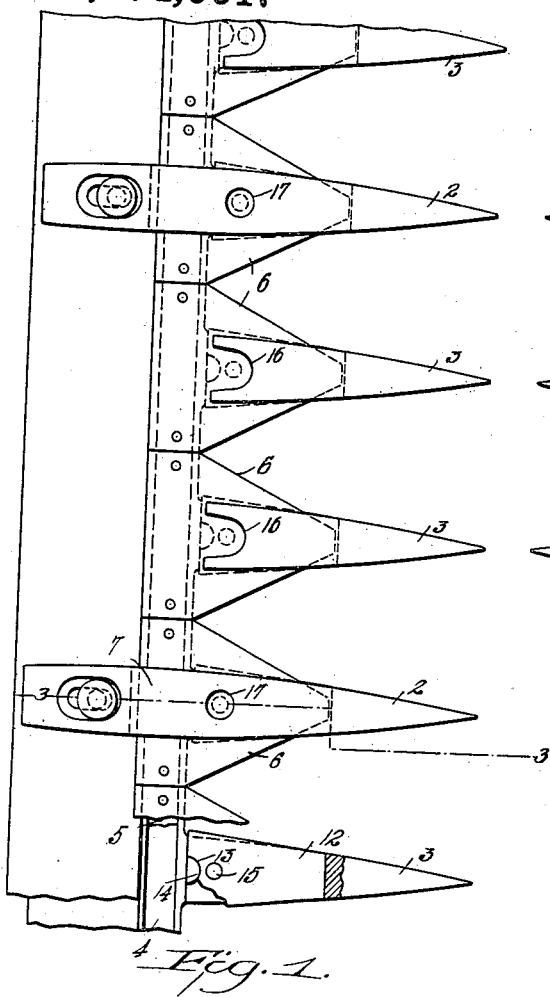
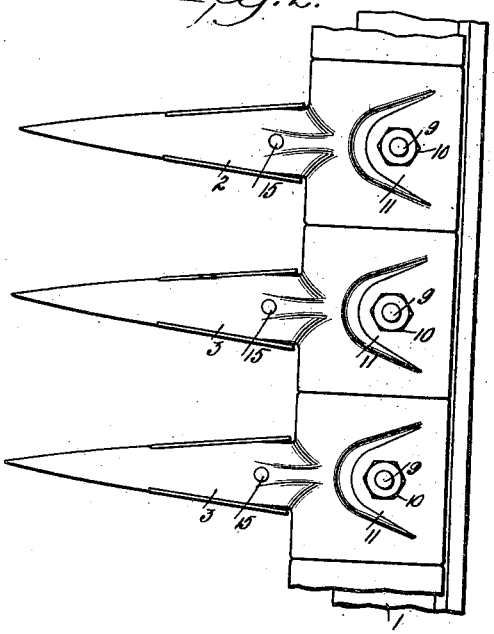
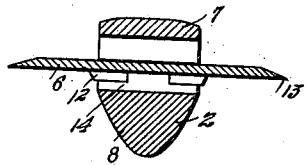
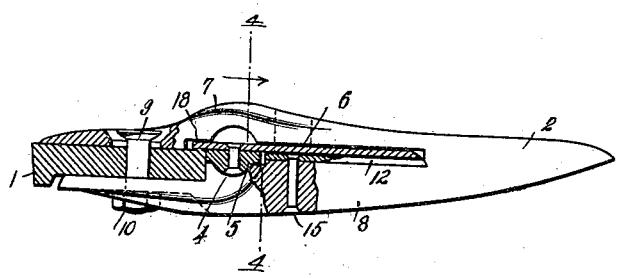
WITNESSES
INVENTOR
J. R. EDGAR
BY
ATTORNEYS

UNITED STATES PATENT OFFICE.

JOHN R. EDGAR, OF AVA, ILLINOIS.

MOWER-GUARD.

1,374,001.

Specification of Letters Patent.

Patented Apr. 5, 1921.

Application filed July 31, 1920. Serial No. 400,420.

*To all whom it may concern:*

Be it known that I, JOHN R. EDGAR, a citizen of the United States, and a resident of Ava, in the county of Jackson and State of Illinois, have invented a new and Improved Mower-Guard, of which the following is a full, clear, and exact description.

This invention relates to improvements in mower guards, an object of the invention being to provide an improved construction of guard finger having integral upper and lower portions secured to opposite sides of the mower bar and exerting pressure or tension upon the cutter bar and cutters to insure a perfect engagement between the cutter blades and the stationary blades or shear plates of the fingers.

A further object is to provide an improved construction of guard finger which can be used on any ordinary mower bar and which is so constructed as to facilitate the assemblage of parts and result in a strong and durable device which will most efficiently perform the functions intended.

With these and other objects in view the invention consists in certain novel features of construction, and combinations and arrangements of parts as will be more fully hereinafter described and pointed out in the claim.

In the accompanying drawings—

Figure 1 is a broken fragmentary plan view illustrating my invention.

Fig. 2 is a fragmentary inverted plan view.

Fig. 3 is a view in section on the line 3—3 of Fig. 1.

Fig. 4 is a view in transverse section on the line 4—4 of Fig. 3.

1 represents a mower bar to which my improved guard fingers 2 and 3 are secured. The guard fingers 2 differ in construction from the guard fingers 3 and are arranged at intervals as may be desired. All of the guard fingers have transverse grooves or recesses 4 for the accommodation of the cutter bar 5 on which the cutters 6 are secured. The guard fingers 2 are made with integral upper and lower portions 7 and 8 which are secured to the mower bar 1 by bolts 9 and nuts 10. The lower portion 8 constitutes a shoe or runner to guide the movement of the mower and is recessed as shown at 11 to accommodate the nuts 10 and prevent contact of the nuts with the ground.

All of the fingers are adapted to receive stationary cutter blades or shear plates 12 over which the movable cutter blades 6 reciprocate. These plates 12 have notched edges 13 to fit over lugs 14 on the fingers and are secured to the fingers by rivets 15.

The upper portions of the fingers 3 are recessed, as shown at 16, and openings 17 are provided in the upper portions of the fingers 2 to accommodate the necessary tools for securing or dislodging the rivets 15.

The fingers 2 in their upper portions have bearing surfaces 18 which bear upon the cutters 6 and exert sufficient downward pressure thereon to maintain the latter in operative engagement with the shear plates 12, thus dispensing with any form of spring pressure device such as is commonly employed for the purpose.

By providing fingers such as shown at 2 at regular intervals and making these fingers with integral upper and lower portions straddling the mower bar 1 and clamped thereto, I not only provide a strong and rigid guard finger construction, but I also insure a pressure against the movable cutter blades sufficient to insure a perfect shearing engagement between said blades and the shear plates 12.

It will be noted that the lower portions of the guard fingers are relatively wide and come together on the bottom of mower bar, and have an extended bearing along the front edge of the mower bar forming a secure bracing system. The upper portion of some of the guard fingers extend over or onto the top of the mower bar and are secured to the top and the bottom of the mower bar forming a rigid bracing throughout. Such bracing does not in any way interfere with the full cutting operation of the sections or knives.

The operation of the device is the same as the ordinary mower construction; namely, the bar 5 with its cutter 6 is caused to reciprocate through the guard fingers and exert a shear cut against the plates 12 in the guard fingers, and by reason of the construction above described, the parts can be readily assembled and repaired and an efficient operation is insured.

Various slight changes might be made in the general form and arrangement of parts described without departing from the invention, and hence I do not limit myself to the precise details set forth, but consider myself at liberty to make such changes and alterations as fairly fall within the spirit and scope of the appended claim.

I claim:

The combination with a mower bar, of guard fingers secured to the mower bar and comprising integral upper and lower portions, both of said portions secured to the mower bar, lugs on the lower portions of the fingers, shear plates located on the lower portions and having notches receiving the lugs, rivets securing said shear plates in the fingers, a reciprocating cutter bar mounted in the fingers, cutter blades secured to the cutter bar and located over the shear plates, and the upper portions of said fingers having bearing surfaces thereon exerting pressure on said movable cutter blades.

JOHN R. EDGAR.